(No Model.)

J. A. TALPEY
SINK.

No. 273,780. Patented Mar. 13, 1883.

Witnesses
Alfred Fawcett
H. E. Bennick

Inventor
Joseph A. Talpey
per C. C. Shaw, Atty.

UNITED STATES PATENT OFFICE.

JOSEPH A. TALPEY, OF SOMERVILLE, MASSACHUSETTS.

SINK.

SPECIFICATION forming part of Letters Patent No. 273,780, dated March 13, 1883.

Application filed October 6, 1882. (No model.)

*To all whom it may concern:*

Be it known that I, JOSEPH A. TALPEY, of Somerville, in the county of Middlesex, State of Massachusetts, have invented a certain new and useful Improvement in Sinks, of which the following is a description sufficiently full, clear, and exact to enable any person skilled in the art or science to which said invention appertains to make and use the same, reference being had to the accompanying drawings, forming a part of this specification, in which—

Figure 1:
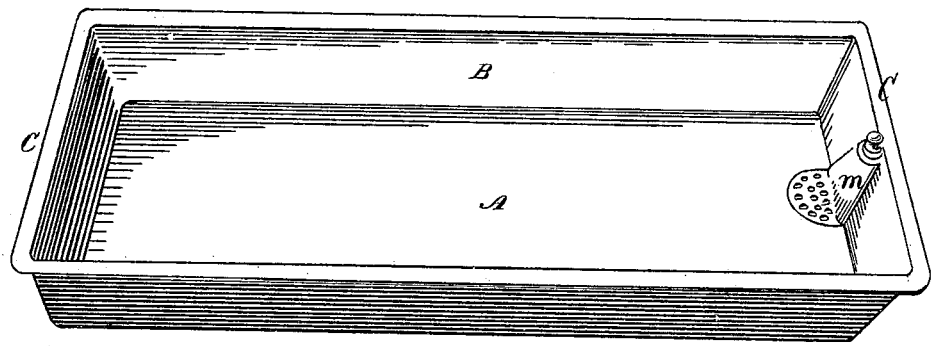
Figures 2, 3:
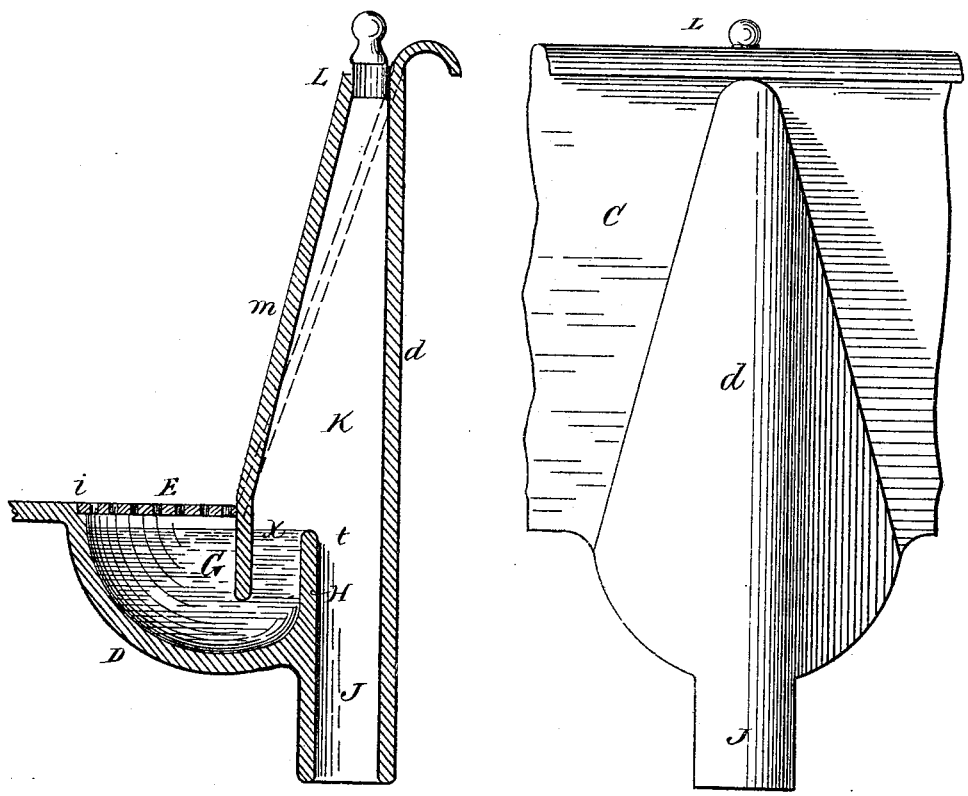

Figure 1 is an isometrical perspective view; Fig. 2, a vertical transverse section of the trap, and Fig. 3 a rear elevation of the same.

Like letters of reference indicate corresponding parts in the different figures of the drawings.

The nature and operation of my improvement will be readily understood by all conversant with such matters from the following explanation, its extreme simplicity rendering an elaborate description unnecessary.

In the drawings, A represents the bottom of the sink, B the sides, and C the ends.

The trap is preferably disposed at one end of the sink, and is formed as best seen in Fig. 2, in which D is the basin, E the strainer, G the guard, H the dam, and J the drain-pipe connecting the sink with the sewer.

The end of the sink at the trap is constructed with double walls, one curving or projecting inwardly, as seen at $m$, and the other outwardly, as seen at $d$, forming the conical tube or space K, which is connected at $x$ with the basin or cup D and at $t$ with the drain-pipe J.

A rabbet or shoulder, $i$, is formed in the bottom of the sink around the top of the cup or basin D, on which the removable strainer E rests, and at the top of the trap there is a plugged opening, L, through which a rod or other proper implement for the purpose may be inserted to open or cleanse the trap in case the same becomes accidentally clogged or choked.

Having thus explained my invention, what I claim is—

A cast-metal sink having a trap integral therewith, consisting of the basin D, provided with a removable strainer, E, the tube K, having an opening at the top closed by a plug, the guard G, the dam H, and the pipe J, substantially as described.

JOSEPH A. TALPEY.

Witnesses:
 C. A. SHAW,
 ALFRED FAWCETT.